No. 644,749. Patented Mar. 6, 1900.
J. H. WIEHL.
AUTOMATIC FLUID PRESSURE FRICTION CLUTCH.
(Application filed Nov. 28, 1898.)
(No Model.) 3 Sheets—Sheet 1.
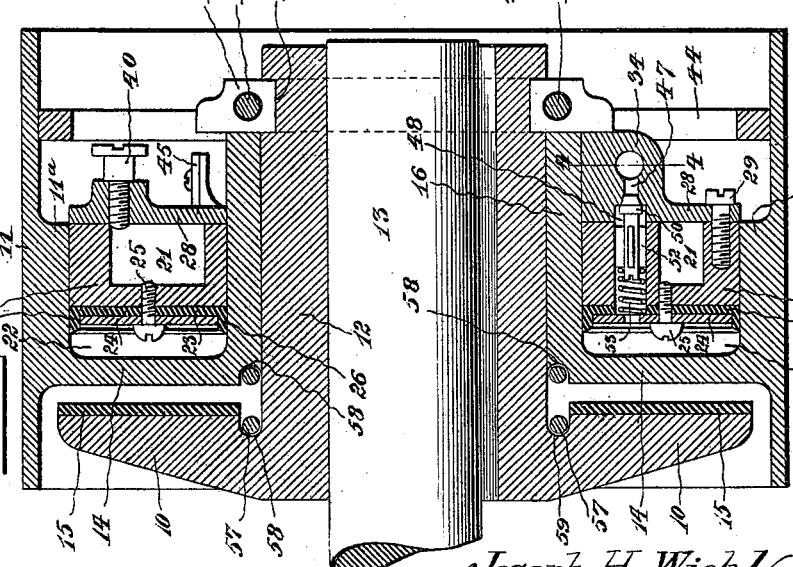
Witnesses
Joseph H. Wiehl, Inventor
By his Attorneys,

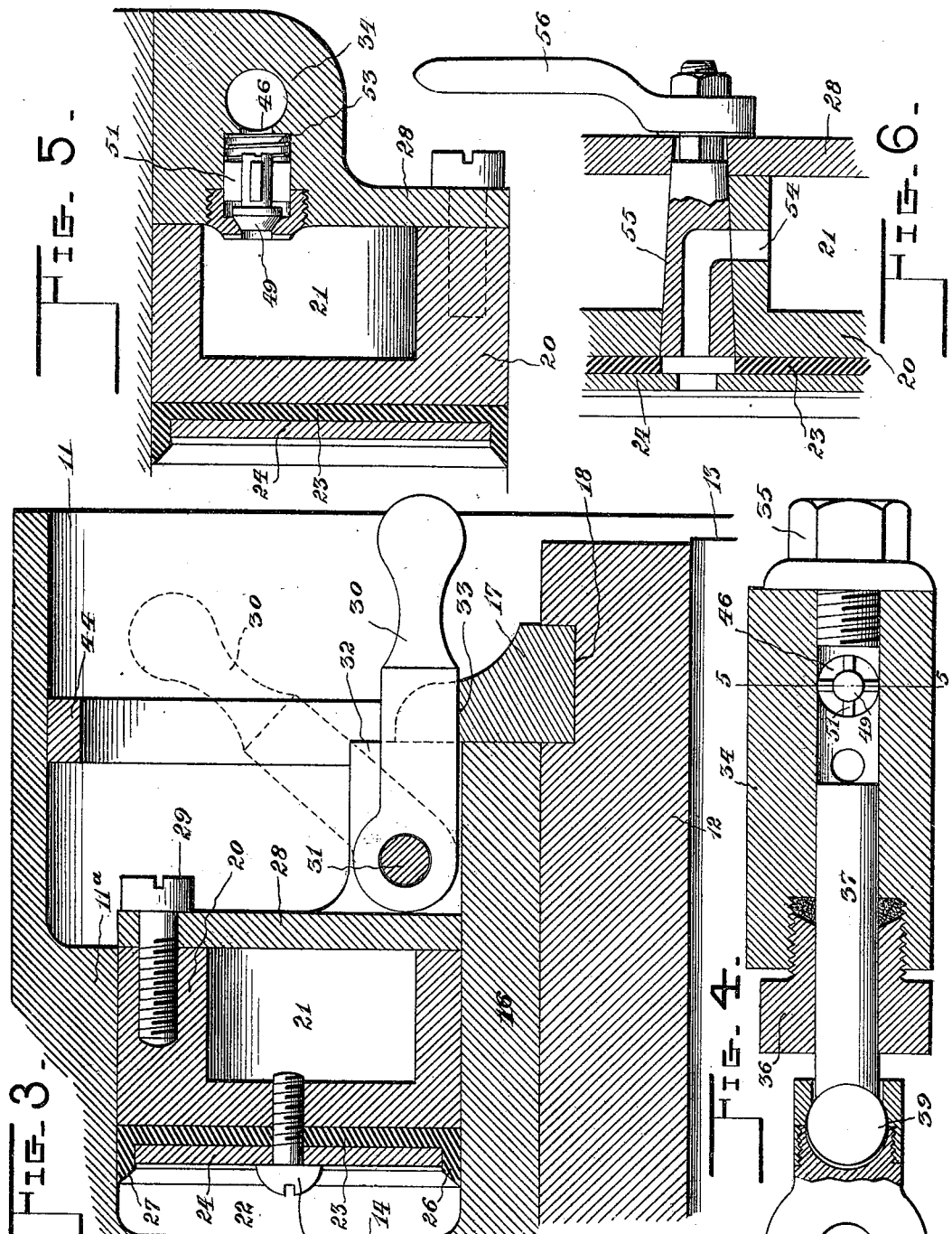

No. 644,749. Patented Mar. 6, 1900.
J. H. WIEHL.
AUTOMATIC FLUID PRESSURE FRICTION CLUTCH.
(Application filed Nov. 28, 1898.)
(No Model.) 3 Sheets—Sheet 3.
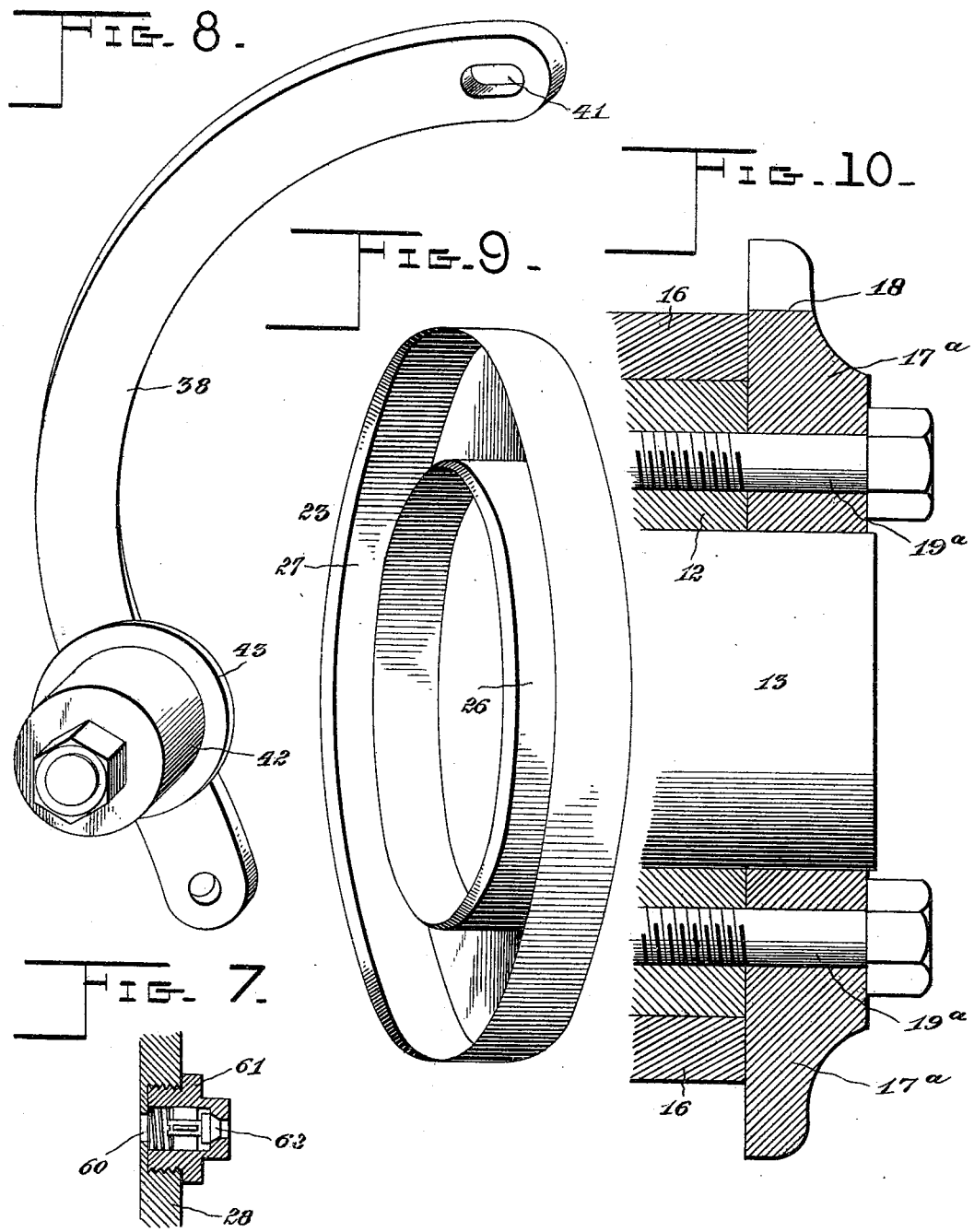
Witnesses
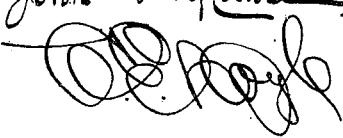
Joseph H. Wiehl, Inventor
By his Attorneys,

United States Patent Office.

JOSEPH H. WIEHL, OF HARMONY, PENNSYLVANIA.

AUTOMATIC FLUID-PRESSURE FRICTION-CLUTCH.

SPECIFICATION forming part of Letters Patent No. 644,749, dated March 6, 1900.

Application filed November 28, 1898. Serial No. 697,655. (No model.)

*To all whom it may concern:*

Be it known that I, JOSEPH H. WIEHL, a citizen of the United States, residing at Harmony, in the county of Butler and State of Pennsylvania, have invented a new and useful Automatic Fluid-Pressure Friction-Clutch, of which the following is a specification.

My invention relates to fluid-pressure friction-clutches, one object in view being to provide improved means for automatically applying pressure to produce the necessary friction between the driving and driven elements when there is relative movement between said elements, the relation between the parts being such that either element may serve as the driver and may rotate in either direction.

A further object of the invention is to provide, in connection with the driving and driven elements, an interposed friction device carried by one of the elements for independent movement and also to provide means for locking said friction device to one of the elements to impart motion to the former.

A further object of the invention is to provide a friction-clutch of the class mentioned in which one of the elements is movable axially toward and from the friction-face on the other element and to provide simple means for receiving the thrust of the friction-producing device during the application of pressure to the friction-face.

A further object of the invention is to provide improved means for controlling the movement of the fluid to and from the pressure chamber or cylinder.

Further objects and advantages of this invention will appear in the following description, and the novel features thereof will be particularly pointed out in the appended claims.

In the drawings, Figure 1 is a face view of a clutch constructed in accordance with my invention. Fig. 2 is a central sectional view of the same on the plane indicated by the line 2 2 of Fig. 1. Fig. 3 is a partial section on the line 3 3 of Fig. 1. Fig. 4 is a detail sectional view of the pump-cylinder on the plane indicated by the line 4 4 of Fig. 2. Fig. 5 is a detail section on the plane indicated by the lines 5 5 of Figs. 1 and 4. Fig. 6 is a detail section on the plane indicated by the line 6 6 of Fig. 1. Fig. 7 is a detail section on the plane indicated by the line 7 7 of Fig. 1. Fig. 8 is a detail view of the pump-lever and the traveler mounted thereon. Fig. 9 is a similar view of the packing-ring. Fig. 10 is a partial section in the plane of Fig. 2, showing a slightly-modified construction and arrangement of thrust-plate adapted for smaller pulleys.

Similar reference characters indicate corresponding parts in all the figures of the drawings.

10 and 11 represent, respectively, the driving and driven elements, consisting, in the construction illustrated, of a friction-disk and a pulley, the driving element or friction-disk having a hub 12, which is keyed or otherwise secured to a shaft 13 or the equivalent thereof. The advantage of a friction-clutch resides in the fact that by its use an engine or other motive element may be started independently of its load and may be allowed to pick up the load gradually to avoid jar after the engine has attained an efficient speed of movement, such a clutch being particularly desirable for use in connection with gas-engines, and it will be understood that while I have referred to the friction-disk 10 as the driving element, in that the shaft 13 may be the driving-shaft of a gas or other engine, the pulley 11 may serve as the driving element to communicate motion to the element 10, and hence to the shaft, when motion is communicated to the parts forming the subject-matter of my invention, and it will be seen, as the nature of my invention is disclosed, that the operation of communicating motion from one element of the clutch to the other will be the same whether one element or the other is employed as driver.

In practice I prefer to construct the pulley with a web 14, set back from one side edge of the flange a sufficient distance to receive and practically house the friction-disk 10, the exterior surface of said web 14 forming a friction-face for contact with the face of the friction-disk; but in order that an efficient frictional contact may be afforded I preferably provide the friction-disk with a facing 15, of leather or other equivalent material, securely cemented and bolted to place. The hub 16 of the pulley extends inward from the web 14 and is loosely mounted for independent rotation upon the hub 12 of the friction-disk and between the plane of the friction-face of said disk and a thrust-plate 17, which is fixed to the driving element 10, as to the hub 12 thereof. In the construction illustrated in Figs. 1, 2, and 3 the hub 12 is extended beyond the adjacent end of the hub 16 and is provided with a circumferential groove 18, in which this thrust-plate is seated, said thrust-plate being of annular construction and also being formed in sections connected by bolts 19, whereby when the bolts are tightened to draw the sections together the inner edge of the thrust-plate is firmly seated in the circumferential groove 18 to bear against the thrust-shoulder formed by the outer wall of said groove, and thus prevent axial displacement of the thrust-plate. (In the modification illustrated in Fig. 10 the thrust-plate 17ᵃ is secured by bolts 19ᵃ to the end of the hub 12, this construction being adapted for small pulleys, wherein the thrust-plate is required to bear a less strain than with a large pulley.) This thrust-plate is secured to the hub of the friction-disk to turn therewith, and hence with the shaft 13, and therefore it will be understood that said thrust-plate forms an essential part of the driving element of the clutch.

Encircling the hub of the pulley or driven element and fitting between said hub and the flange, which is preferably thickened inwardly, as shown at 11ᵃ, is a piston 20, of annular construction, which is recessed to form a reservoir 21 for the pressure fluid, which may consist of oil, water, or any substitute found to be efficient in producing the desired pressure. Between the face of the piston and the adjacent surface of the web 14 is a pressure chamber or cylinder 22, designed to receive fluid under pressure to advance the pulley axially upon the hub 12 toward the friction-disk to bring the friction-face of the web 14 into contact with the friction-face 15. This pressure-chamber is also of annular construction, and to prevent a reduction of pressure by leakage or otherwise and at the same time allow a free relative movement of the parts I provide the face of the piston with a forwardly-channeled packing-ring 23, held in place by a follower-plate 24, which is secured by means of screws 25, said packing-ring having inner and outer yielding or expansible edges or flanges 26 and 27, between which the follower-plate is seated, and being constructed of leather or a composition of lead and Babbitt metal or other equivalent material designed to pack the joint between the moving parts without interfering materially with the adjustment of the driven member by the pressure exerted in the chamber 22. The edges of the flanges or lips 26 and 27 are beveled at their inner sides to increase the efficiency of the application of pressure thereto.

The friction device, consisting, essentially, of the piston, is preferably provided with a front plate or head 28, secured in place by means of bolts or cap-screws 29 and closing the front side of the reservoir 21, and rotary motion may be communicated directly from the driving element of the clutch to the friction device by means of a latch 30, which in the construction illustrated is fulcrumed, as at 31, upon a lug or boss 32 on the cap-plate or head 28 and is adapted to engage a seat or notch 33 in the periphery of the thrust-plate 17. In starting the engine this latch should be unseated to leave the driving element free to turn independently of the driven element and also of the friction device; but when a desired speed of rotation of the driving element has been attained the latch may be dropped into the seat or notch 33 to cause the communication of rotary motion from the driving element to the friction device for a purpose hereinafter explained. Also carried by the friction device and preferably formed integral with the cap-plate or head 28 is a pump-cylinder 34, disposed parallel with a tangent of the pulley, having at one end a removable cap 35 and at the other end a stuffing-box 36, through which extends a pump-plunger 37, connected with a pump-lever 38. This pump-lever is connected with the plunger by a knuckle-joint, (shown at 39,) and is mounted at the other end upon a fulcrum-pin 40, projecting forward from the head 28, said lever being provided at its fulcrumed end with an elongated opening or slot 41 to allow the plunger to operate in a right line without cramping. The pump-lever carries a traveler 42, consisting of a roller, which may be flanged at its inner or rear side, as shown at 43, and this traveler traverses a cam-surface formed by a ring 44, secured to the inner surface of the flange of the pulley. The traveler is held in contact with this cam by yielding means, and although centrifugal force may be utilized in this connection I prefer to supply a spring 45, which bears terminally against the pump-lever.

The pump-cylinder is provided with inlet and outlet ports 46 and 47, communicating, respectively, with the reservoir 21 and the pressure-chamber, a channel 48 being formed in a solid portion or interior boss of the piston and extending through to the surface of the follower-plate 24. These inlet and outlet ports are fitted, respectively, with inwardly and outwardly opening valves 49 and 50, of which the stems are preferably winged, as shown at 51 and 52, and the valves are yieldingly held seated in opposition to fluid-pressure by means of springs 53. Also connecting the pressure-chamber with the reservoir is a discharge-port 54, controlled by a valve 55, having an exterior handle 56, by means of which the operator may open the valve (by turning the handle to the dotted position indicated in Fig. 1) to allow pressure in the chamber 22 to escape into the reservoir 21, a friction-releasing device consisting of a spring 57 being interposed between the driving and driven elements of the clutch and exerting a constant pressure in opposition to the fluid-pressure to separate the friction-faces of the elements when the variable or fluid pressure is reduced, and thus force the fluid from the pressure-chamber through the discharge-port into the reservoir. In the construction illustrated this releasing-spring is of coiled construction and is seated in facing grooves 58 and 59, formed in the hub 16 of the driven element and in the friction-disk of the driving element, respectively. The reservoir may be charged with the pressure fluid through a feed-opening 60, fitted with a removable cap 61, having an inwardly-opening relief-valve 62, through which air may be supplied to the interior of the reservoir as the pressure fluid is withdrawn therefrom and forced by the pump into the pressure-chamber. 63 represents an oil-cup designed for furnishing lubricant to the bearing-surfaces of the driving and driven elements, as between the hubs 12 and 16.

In operation the driving element of the clutch, whether the pulley or the friction-disk, may be disengaged from the other element or thrust out of operative relation therewith by disengaging the latch 30 from the seat 33, whereby the driving element may turn independently of the other members of the device, and when the driving element is coupled to the friction device by engaging the latch with the thrust-plate the friction device, consisting of a piston 30 and attached parts, will rotate with the driving element, thereby causing the traveler 42 to traverse the cam 44 and reciprocate the plunger 37. This reciprocation draws pressure fluid from the reservoir to the valve-port 46 and discharges it through the port 47 into the pressure-chamber to advance the driven element axially toward the friction-disk. As the friction-faces come into contact gradually, thus gradually increasing the frictional contact, it will be understood that the motion of the driving element will be communicated gradually to the driven element, depending upon the load which may be connected with the driven element; but the pressure in the chamber 22 will be increased until the contact between the friction-faces is sufficient to cause a rotation of the driven element at the same speed as the driving element, or, in other words, until the relative movement between the driving and driven elements ceases. So long as there is any relative movement between the driving and driven elements the traveler will traverse the cam, and thus will continue the operation of the pump-plunger to increase the pressure in the chamber 22. When the desired pressure has been attained and the elements move coincidentally, the reciprocation of the pump-plunger will cease and the parts will retain this position until, by an increase of load or other change of conditions, the friction-faces slip, and thus again operate the pump-plunger to further increase the pressure. To disengage the driving and driven elements, the discharge-valve will be opened to allow the pressure in the chamber 22 to exhaust into the reservoir, the releasing-spring 57 serving to separate the friction-faces.

It will be seen, furthermore, that the pressure-chamber is formed within the space inclosed by the flange of the pulley and that the piston which operates in said chamber, together with the pump mechanism and operating connections, is housed within the flange of the pulley to avoid exterior projections and adapt the device to occupy the minimum space. There are no parts exposed for contact with adjacent objects, and the mechanism cannot be injured or affected by the displacement of a belt from the pulley or by any other disarrangement of adjacent machine elements.

In practice various changes in the form, proportion, and the minor details of construction may be resorted to without departing from the spirit or sacrificing any of the advantages of the invention.

Having described my invention, what I claim is—

1. In a friction-clutch, the combination with driving and driven elements, of a coöperating friction device, and mechanism for operating the same, said mechanism having a pair of members, one of which is movable relatively to the other, a projection with a seat therein on the driving element, and a latch movably mounted on the friction device for engagement with the said seat.

2. In a friction-clutch, the combination of driving and driven elements, one of which is axially movable toward and from the other, a friction device for actuating the axially-movable element, said device having a piston held from axial movement and revolubly seated in a pressure-chamber in the axially-movable element, and automatic mechanism for operating the friction device, having a member actuated by a device on the axially-movable element.

3. In a friction-clutch, the combination of driving and driven elements, one of which is axially movable toward and from the other, a friction device for actuating the axially-movable element, said device having a piston revolubly seated in a pressure-chamber in the axially-movable element, a thrust-plate carried by the other element to resist axial movement of the piston, and automatic mechanism for operating the friction device, and having a member actuated by a device on the axially-movable element, substantially as specified.

4. In a friction-clutch, the combination of driving and driven elements, one of which is axially movable toward and from the other, a friction device for actuating the axially-movable element, said device having a piston held from axial movement and revolubly seated in a pressure-chamber in the axially-movable element, means for locking said piston to the other element, to prevent relative movement of the piston and said element, and automatic mechanism for operating the friction device, and having a member actuated by a device on the axially-movable element, substantially as specified.

5. In a friction-clutch, the combination of driving and driven elements, one of which is axially movable toward and from the other, a friction device for actuating the axially-movable element, said device having a piston revolubly seated in a pressure-chamber in the axially-movable element, a thrust-plate carried by the other element to prevent axial movement of the piston in one direction, means for locking the piston to said other element for preventing relative rotary movement of said piston and element, and automatic mechanism for operating the friction device, and having a member actuated by a device on the axially-movable element, substantially as specified.

6. In a friction-clutch, the combination of driving and driven elements having opposite separable friction-faces, one of said elements being axially movable, spring means for separating said faces, a friction device for advancing the axially-movable element in opposition to said spring means and provided with a piston held from axial movement and seated in a pressure-chamber in the axially-movable element, an automatic pumping mechanism for operating said friction device, and a lever and a cam carried respectively by the friction device and by one of said elements, the cam being outside of the lever and the latter held in contact therewith by an interposed yielding device.

7. In a friction-clutch, the combination of driving and driven elements, one of which is provided with a hub and the other being mounted upon said hub and having a concentric flange, a friction device housed in the flanged element and designed to cause the communication of motion from the driving element to the driven element, a projection on the said hub having a seat, a pivotal latch carried by the friction device and adapted to engage the said seat, and automatic pumping mechanism operating the friction device, the said pumping mechanism being controlled by a lever and a cam carried respectively by the friction device and one of the said elements.

8. In a friction-clutch, the combination of driving and driven elements having opposing friction-faces, one of which is provided with a hub and the other mounted upon said hub for axial movement, a friction device mounted upon said axially-movable element for advancing the latter and bringing said friction-faces into contact, locking mechanism carried in part by the friction device and driving element and adapted to be thrown into engagement to connect them, and automatic fluid-pumping mechanism for operating the friction devices, the same being controlled by a lever and a cam carried respectively by the friction device and driven element, the cam being outside of the lever.

9. In a friction-clutch, the combination of driving and driven elements having opposing friction-faces and also provided with concentric hubs, of which the outer one is revoluble independently of the inner one and axially movable thereon, a friction device having a piston mounted upon the axially-movable hub for axially advancing the element of which said hub forms a part, latch mechanism for connecting the friction device and the inner element, and automatic fluid-pumping mechanism for operating the friction device, the same being controlled by a lever and a cam carried respectively by the friction device and driven element, the cam being outside of the lever.

10. In a friction-clutch, the combination of driving and driven elements, one of which is axially movable toward and from the other and provided with a hub and a concentric flange forming inner and outer guides, the said elements having hubs in bearing relation to each other, a friction device actuating the axially-movable element and having an annular piston fitted between said guides and held from axial movement, the mechanism for connecting the friction device and the driving element, and automatic fluid-pumping mechanism for operating the friction device, the same having a lever and a cam carried respectively by said friction device and one of the elements, a part of the lever being held in contact with the cam, and the latter located outside of said lever.

11. In a friction-clutch, the combination of driving and driven elements, one of which is provided with a friction-disk and the other axially movable on the element carrying the friction-disk and provided with a web for contact with the latter, and a flange extending in both directions from the plane of said web, one portion of said flange overhanging and encircling the friction-disk of the first-named element, a friction device seated and housed in the axially-movable element at the opposite side of the plane of said web from the friction-disk and adapted for actuating said axially-movable element, and automatic fluid-pumping mechanism for operating the friction device, the same having a lever and a cam carried respectively by said friction device and the driven element, the cam being outside of the lever.

12. In a friction-clutch, the combination of driving and driven elements, one of which is axially movable toward and from the other and recessed to form an annular pressure-chamber, one of said elements also being provided with a friction-disk and the other axially movable and having a web for contact with said friction-disk, a friction device for actuating the axially-movable element, said device having a piston held from axial movement and seated in said pressure-chamber, a flanged packing-ring carried by the face of the piston and having inner and outer concentric beveled flanges in contact with the inner and outer walls of the pressure-chamber, an annular follower-plate seated between the flange of the packing-ring, and automatic fluid-pumping mechanism for operating the friction device, the same having a lever and a cam carried respectively by said friction device and the driven element, the cam being outside of the lever.

13. In a friction-clutch, the combination of driving and driven elements, one of which is axially movable toward and from the other, a friction-producing device for actuating the axially-movable element, and having a piston fitted in a pressure-chamber in the axially-movable element, and automatic mechanism for operating the friction device, the same having a pump, and coöperating pump-actuating members including a traveler and a cam, and means for locking the friction device to the driving element.

14. In a friction-clutch, the combination of driving and driven elements, one of which is provided with a flange, a friction device having a piston located in a pressure-chamber in the flanged element, automatic mechanism for operating the friction device comprising a cam carried by said flange, a pump, a traveler for actuating the movable member of the pump traversing said cam and carried by the friction device, and a latch attachment on the friction device adapted to engage a portion of the other element to connect the same with the friction device.

15. In a friction-clutch, the combination of driving and driven elements, one of which is axially movable toward and from the other, the axially-movable element having a pressure-chamber therein, a friction-producing device for actuating the axially-movable element and having a piston mounted in the pressure-chamber and recessed to form a reservoir for piston-actuating fluid, and automatic mechanism for operating the friction device, comprising a pump and coöperating pump-actuating members, including a traveler and a cam, and means for connecting the friction device and one of said elements.

16. In a friction-clutch, the combination of driving and driven elements, one of which is provided with a pressure-chamber, a friction device comprising a piston fitted in said pressure-chamber and recessed to form a reservoir, automatic mechanism for operating the friction device, comprising a pump for forcing fluid from the reservoir into the pressure-chamber, and coöperating pump-actuating members, including a traveler and a cam, means for locking the friction device and the driving element, and a relief-valve controlling a port in communication with the reservoir and pressure-chamber.

In testimony that I claim the foregoing as my own I have hereto affixed my signature in the presence of two witnesses.

JOS. H. WIEHL.

Witnesses:
W. H. SHAFFER,
KARL J. RIPPER.